(12) United States Patent
Kang

(10) Patent No.: US 12,230,986 B2
(45) Date of Patent: Feb. 18, 2025

(54) FOLDABLE ELECTRONIC DEVICE

(71) Applicant: HUAWEI TECHNOLOGIES CO., LTD., Shenzhen (CN)

(72) Inventor: Yuezeng Kang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 474 days.

(21) Appl. No.: 17/618,740

(22) PCT Filed: Jun. 10, 2020

(86) PCT No.: PCT/CN2020/095336
§ 371 (c)(1),
(2) Date: Dec. 13, 2021

(87) PCT Pub. No.: WO2020/248999
PCT Pub. Date: Dec. 17, 2020

(65) Prior Publication Data
US 2022/0247190 A1 Aug. 4, 2022

(30) Foreign Application Priority Data
Jun. 13, 2019 (CN) .......... 201910510699.9

(51) Int. Cl.
H02J 7/00 (2006.01)
(52) U.S. Cl.
CPC .......... *H02J 7/0042* (2013.01); *H02J 7/0013* (2013.01); *H02J 7/0048* (2020.01)
(58) Field of Classification Search
CPC ....................................................... H02J 7/00
See application file for complete search history.

(56) References Cited

U.S. PATENT DOCUMENTS 6,081,096 A * 6/2000 Barkat .................... H02J 9/061
320/124
2008/0106234 A1 5/2008 Yun

FOREIGN PATENT DOCUMENTS

| CN | 202363960 U | 8/2012 |
| CN | 202487712 U | 10/2012 |
| CN | 202651275 U | 1/2013 |
| CN | 203398237 U | 1/2014 |
| CN | 105449727 A | 3/2016 |

(Continued)

OTHER PUBLICATIONS

Extended European Search Report issued in corresponding European Application No. 20822470.9, dated Jul. 28, 2022, pp. 1-8.

(Continued)

*Primary Examiner* — Robert Grant
(74) *Attorney, Agent, or Firm* — HAUPTMAN HAM, LLP

(57) ABSTRACT

An electronic device includes a charging circuit, a control circuit, a first battery branch circuit, a second battery branch circuit, a first accommodation space, and a second accommodation space. The first battery branch circuit and the second battery branch circuit are connected in parallel. The first battery branch circuit includes a first battery and a first switch that are connected to each other in series. The second battery branch circuit includes a second battery. The first battery is disposed in the first accommodation space, and the second battery is disposed in the second accommodation space. The first accommodation space and the second accommodation space are connected through a bendable member.

19 Claims, 6 Drawing Sheets

(56) References Cited

FOREIGN PATENT DOCUMENTS

| | | |
|---|---|---|
| CN | 106385067 A | 2/2017 |
| CN | 106953391 A | 7/2017 |
| CN | 107370202 A | 11/2017 |
| CN | 207251696 U | 4/2018 |
| CN | 108900673 A | 11/2018 |
| CN | 109149682 A | 1/2019 |
| CN | 109245220 A | 1/2019 |
| CN | 109286702 A | 1/2019 |
| CN | 109347171 A | 2/2019 |
| CN | 110277813 A | 9/2019 |
| EP | 3721526 A1 | 10/2020 |
| IN | 103928974 A | 7/2014 |
| JP | 2008167562 A | 7/2008 |
| WO | 2019139750 A1 | 7/2019 |

OTHER PUBLICATIONS

International Search Report issued in corresponding International Application No. PCT/CN2020/095336, dated Aug. 28, 2020, pp. 1-11.

Chinese Office Action issued in corresponding Chinese Application No. 201910510699.9, dated Jun. 11, 2020, pp. 1-56.

European Office Action issued in corresponding European Application No. 20822470.9, dated Dec. 11, 2023, pp. 1-4.

\* cited by examiner

FOLDABLE ELECTRONIC DEVICE

This application is a National Stage of International Application No. PCT/CN2020/095336, filed on Jun. 10, 2020, which claims priority to Chinese Patent Application No. 201910510699.9, filed on Jun. 13, 2019, which are incorporated herein by reference in their entireties.

BACKGROUND

With development of science and technology, a mobile terminal features an increasingly powerful function, and a user works and makes an entertainment by using the mobile terminal. The user has an increasingly high request for a large battery capacity of the mobile terminal and fast battery charging. The request of the user is unable to be met if a single-battery design with a large capacity is used. In a dual-battery design, a charging speed is increased while a large battery capacity is ensured, to make a battery more stable.

Current dual-battery designs include a series charging/discharging design and a parallel charging/discharging design. The series charging/discharging design uses a matching charger to implement a series charging function, and is incompatible with a universal charger that is widely popular in the market. The parallel charging/discharging design is relatively widely applied. As shown in FIG. 1, a charging/discharging circuit includes two batteries (a battery 1 and a battery 2) connected in parallel, a load switch unit, and a battery status detection control unit. The battery status detection control unit controls the load switch unit to switch a battery. There is one battery in a charging/discharging process. That is, the battery 2 is charged after the battery 1 is fully charged, and the battery 2 starts to be discharged after the battery 1 is completely discharged.

In the charging/discharging process of the dual-battery design, the load switch unit needs to be passed through, there is a heat loss for the load switch unit, and a battery capacity is consumed. In addition, one battery is in a working state in the charging/discharging process. Therefore, a discharging capability is insufficient and charging time is long.

SUMMARY

This application provides a foldable electronic device, to increase a charging speed and improve a discharging capability of the electronic device.

To achieve the foregoing objective, this application provides a foldable electronic device, including two batteries that are connected to each other in parallel. The two batteries are respectively disposed in a first accommodation space and a second accommodation space. The first accommodation space and the second accommodation space are connected through a bendable member. During charging, a charging circuit simultaneously charges the two batteries. The electronic device further includes a switch configured to regulate a charging current that flows to the first battery.

According to the foldable electronic device provided in the embodiments, the first battery and the second battery with different capacities are connected in parallel, and the two batteries are simultaneously charged, to increase a charging speed of the electronic device. In addition, the charging current of the battery is regulated by using the switch, to ensure charging safety.

In an implementation, the electronic device includes a first switch and a second switch that are connected to each other in parallel, and the two switches are connected in series in a branch circuit in which the first battery with a relatively small battery capacity in the two batteries is located. The first switch is a charging and current limiting switch, and the second switch is a discharge switch. During charging, a control circuit controls the first switch to be closed and the second switch to be open, and the charging circuit simultaneously charges the two batteries. During discharging, the control circuit controls the first switch to be open and the second switch to be closed, and the two batteries simultaneously supply power to a load circuit of the electronic device. Working states of the first switch and the second switch are controlled to simultaneously charge or discharge the two batteries, to increase a charging speed and improve a discharging capability of the electronic device.

In an implementation, the electronic device further includes a galvanometer. The galvanometer is connected in series in the branch circuit in which the first battery is located and/or a branch circuit in which the second battery is located, to detect charging currents of both the two batteries. When the charging current detected by the galvanometer is greater than a safety threshold current of the battery, the charging circuit is controlled to reduce the output charging current, to ensure that both the two batteries work in a normal state, prevent the batteries from being overcharged or over discharged, and prolong service lives of the batteries.

In an implementation, the electronic device further includes a battery fuel gauge. A total battery level of the two batteries is learned of by detecting the battery fuel gauge, and the total battery level of the batteries is displayed on a display interface of the electronic device. A total charging current of the two batteries is learned of by detecting the battery fuel gauge. When the total charging current is greater than a safety threshold current output by the charging circuit, the charging current output by the charging circuit is reduced, to ensure that both the two batteries work in a normal state, prevent the batteries from being overcharged or over discharged, and prolong service lives of the two batteries.

In an implementation, the electronic device further includes a first temperature sensor and a second temperature sensor, and each of the first temperature sensor and the second temperature sensor is connected to the control circuit. The first temperature sensor is configured to detect a working temperature of the first battery, and the second temperature sensor is configured to detect a working temperature of the second battery. The control circuit learns of the working temperature of the first battery and the working temperature of the second battery by detecting the first temperature sensor and the second temperature sensor, and dynamically regulates the charging current of the charging circuit when the working temperature exceeds a safety threshold temperature of the battery, to prevent the batteries from being charged at a relatively high temperature, prolong service lives of the batteries, and achieve an optimal charging speed.

In an implementation, the electronic device further includes a first printed circuit board and a second printed circuit board. The first printed circuit board and the second printed circuit board are respectively disposed in the first accommodation space and the second accommodation space. The two batteries are respectively connected to the two printed circuit boards through connectors. Another circuit component inside the electronic device is disposed on a corresponding printed circuit board based on a connection relationship with the two batteries, to implement compact layout. If there are remaining spaces in the electronic device, a battery capacity of the electronic device is further expanded. For example, a third battery is added, or the two existing batteries are expanded, to maximize the battery capacity of the electronic device.

The embodiments provide the foldable electronic device. The electronic device includes the charging circuit, the control circuit, the first battery branch circuit, the second battery branch circuit, the first accommodation space, and the second accommodation space. The first battery branch circuit and the second battery branch circuit are connected in parallel. The first battery branch circuit includes the first battery and the first switch that are connected to each other in series. The second battery branch circuit includes the second battery. The first battery is disposed in the first accommodation space, and the second battery is disposed in the second accommodation space. The first accommodation space and the second accommodation space are connected through the bendable member. The first battery and the second battery are connected in the foregoing connection manner, and the control circuit controls the charging circuit and the first switch to simultaneously charge the two batteries, to increase a charging speed of the electronic device. Proper space layout is performed for the first battery and the second battery, so that internal space utilization of the electronic device is improved, to maximize a battery capacity of the electronic device.

DESCRIPTION OF EMBODIMENTS

The embodiments of this application provide a foldable electronic device. The electronic device is used in the following two states: a folded state and an expanded state. When the electronic device is in the folded state, there is one display screen (a main display screen) displayed. When the electronic device is in the expanded state, display screens are simultaneously displayed, for example, two screens are displayed, or three screens are displayed. The foldable electronic device is an electronic device such as a smartphone, a notebook computer, a tablet computer, a smartwatch, an electronic book, a VR (Virtual Reality, virtual reality) device, or an AR (Augmented Reality, augmented reality) device. The foldable electronic device supports installation of various types of desktop applications, and a user displays various desktop applications on a single screen, two screens, or a plurality of screens. The desktop applications include but are not limited to a photo application, a browser application, an instant messaging application, a game application, a video player application, and an office automation application.

The foldable electronic device includes at least two display screens, and in an actual process of use by the user, more power is consumed in multi-screen display than in single-screen display. Therefore, a battery capacity of the foldable electronic device needs to be expanded, to increase standby duration of the electronic device. To achieve the foregoing technical effects, in the embodiments of this application, a multi-battery parallel design is used, batteries with different capacities are connected in a preset connection manner, and proper space layout is performed, to improve internal space utilization of the electronic device, and to maximize the battery capacity of the electronic device. The electronic device is controlled by software to simultaneously charge and discharge a plurality of batteries, to increase a charging speed and improve a discharging capability of the batteries.

The foldable electronic device provided in this application is described below in detail by using specific embodiments. The following several specific embodiments are combined with each other. Same or similar content is not repeatedly described in different embodiments.

For ease of description, a circuit connection and space layout inside the electronic device are described in the following embodiments by using an example in which the electronic device includes two accommodation spaces and two batteries. Certainly, quantities of accommodation spaces and batteries in the electronic device is expanded based on an actual parameters.

Figure 1:
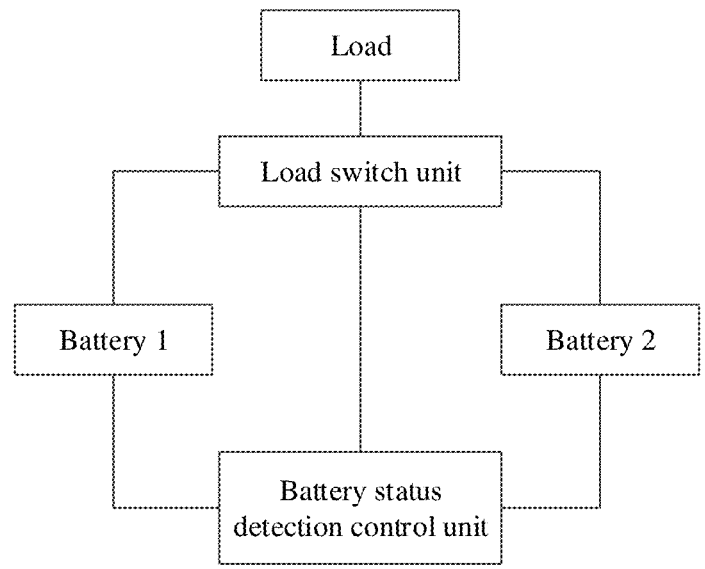
FIG. 1 is a schematic diagram of a circuit connection of a dual-battery design in the conventional technology.
Figure 2:
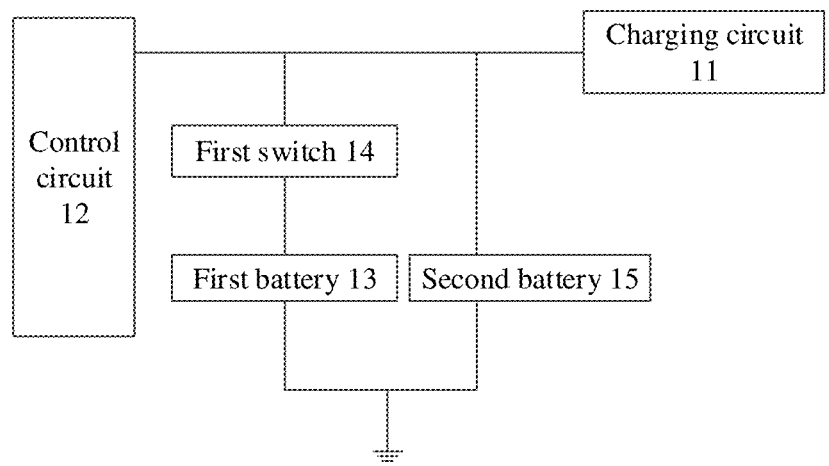
FIG. 2 is a schematic diagram of a hardware connection inside a first foldable electronic device according to an embodiment of this application.

FIG. 2 is a schematic diagram of a hardware connection inside a first foldable electronic device according to an embodiment of this application. As shown in FIG. 2, the electronic device 10 provided in this embodiment includes a charging circuit 11, a control circuit 12, a first battery branch circuit, and a second battery branch circuit. The first battery branch circuit and the second battery branch circuit are connected in parallel. The first battery branch circuit includes a first battery 13 and a first switch 14. The first battery 13 and the first switch 14 are connected in series. The second battery branch circuit includes a second battery 15.

Figure 3:
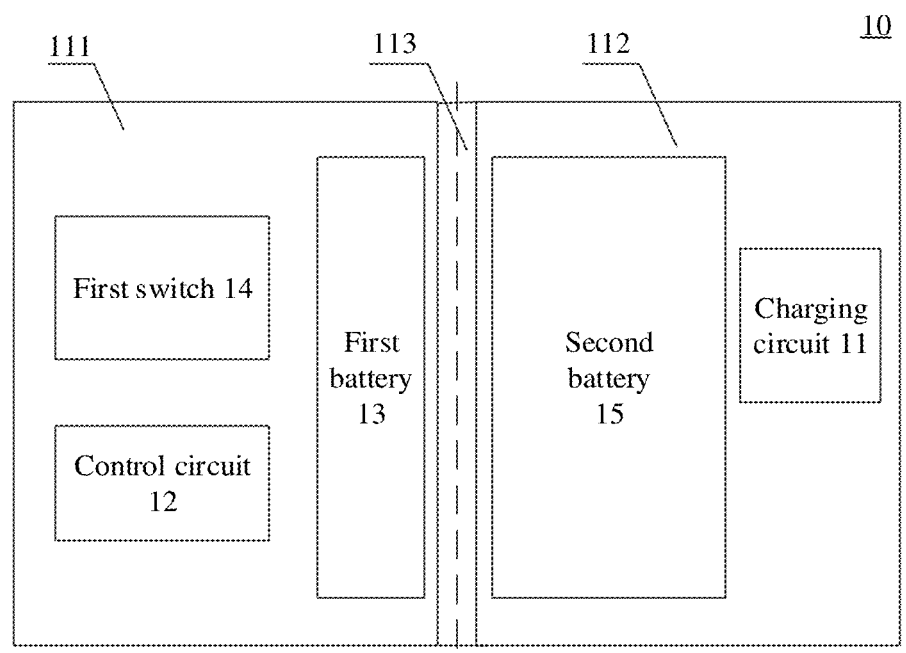
FIG. 3 is a schematic diagram of a spatial structure of a first foldable electronic device according to an embodiment of this application.

FIG. 3 is a schematic diagram of a spatial structure of a first foldable electronic device according to an embodiment of this application. As shown in FIG. 3, the electronic device 10 provided in this embodiment includes a first accommodation space 111 and a second accommodation space 112. The first accommodation space 111 and the second accommodation space 112 are connected through a bendable member 113. The first battery 13 is disposed in the first accommodation space 111, and the second battery 15 is disposed in the second accommodation space 112. Optionally, the first switch 14 and the control circuit 12 are disposed in the first accommodation space 111, and the charging circuit 11 is disposed in the second accommodation space 112.

When a charger is connected to the electronic device, the control circuit 12 controls the charging circuit 11 to simultaneously charge the first battery 13 and the second battery 15. The control circuit 12 is further configured to control a working state of the first switch 14, to regulate a charging current that flows to the first battery 13.

The first switch 14 in this embodiment is a charging and current limiting switch, and has a function of a switch and a current limiting function. The control circuit 12 controls a closing degree of the first switch 14, to control a magnitude of the charging current that flows to the first battery 13. Specifically, the control circuit 12 regulates an impedance value of the first switch 14, to control the magnitude of the charging current of the first battery 13.

In this embodiment, a battery capacity of the first battery 13 is less than a battery capacity of the second battery 15. To simultaneously charge/discharge the two batteries, the first switch 14 is connected in series in a branch circuit in which the first battery 13 is located, to limit the magnitude of the charging current that flows to the first battery 13, prevent the first battery 13 from being overcharged, prolong a battery life of the first battery 13, and ensure a charging speed and the service life of the battery.

According to the foldable electronic device provided in this embodiment, the first battery and the second battery with different capacities are connected in the preset connection manner, and the control circuit controls the charging circuit and the first switch to simultaneously charge the first battery and the second battery, to increase a charging speed of the electronic device. Proper space layout is performed for the first battery and the second battery with different capacities, and internal space utilization of the electronic device is improved, to maximize a battery capacity of the electronic device.

Figure 4:
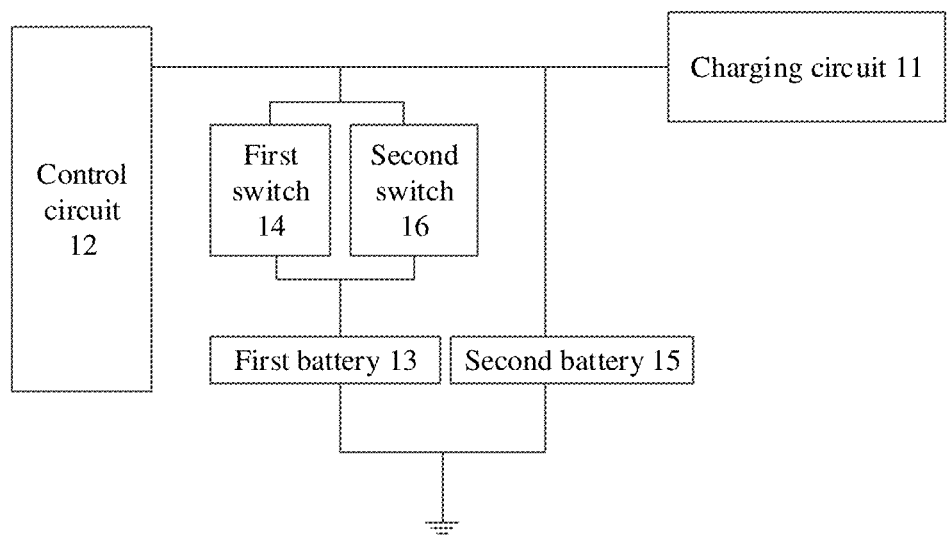
FIG. 4 is a schematic diagram of a hardware connection inside a second foldable electronic device according to an embodiment of this application.

FIG. 4 is a schematic diagram of a hardware connection inside a second foldable electronic device according to an embodiment of this application. Based on the embodiment shown in FIG. 2, as shown in FIG. 4, the first battery branch circuit further includes a second switch 16. The second switch 16 and the first switch 14 are connected in parallel. The first battery 13 supplies power to a load circuit of the electronic device 10 through the second switch 16. The second switch 16 in this embodiment is a discharge switch, and the control circuit 12 controls the second switch 16 to be closed, to supply power to the load circuit of the electronic device 10.

The second switch 16 is connected to the first switch 14 in parallel, and therefore the second switch is disposed in the first accommodation space 111.

In a charging process, the control circuit 12 controls the charging circuit to simultaneously charge the first battery 13 and the second battery 15. Specifically, the control circuit 12 controls the first switch 14 in the branch circuit of the first battery 13 to be closed, and controls the second switch 16 in the branch circuit of the first battery 13 to be open, to implement a process of simultaneously charging the first battery 13 and the second battery 15 in the electronic device. A battery capacity of the first battery 13 is less than a battery capacity of the second battery 15, and therefore the control circuit 12 controls a closing degree of the first switch 14, to control a magnitude of a charging current of the branch circuit of the first battery 13.

In a discharging process, the control circuit 12 controls the first switch 14 and the second switch 16, so that the first battery 13 and the second battery 15 simultaneously supply power to a load. Specifically, the control circuit 12 controls the first switch 14 in the branch circuit of the first battery 13 to be open, and controls the second switch 16 in the branch circuit of the first battery 13 to be closed. An impedance value of the second switch 16 is less than that of the first switch 14.

Usually, for batteries made of a same battery material, a larger capacity of a battery indicates a smaller resistance value of the battery. In this embodiment, the battery capacity of the first battery is less than the battery capacity of the second battery. Therefore, when the first battery and the second battery are made of a same material, a resistance value of the first battery is greater than a resistance value of the second battery. At a constant voltage, a current value in the branch circuit of the first battery is less than a current value in a branch circuit of the second battery. In the discharging process, a total current value in a discharging circuit is equal to a sum of the current value in the branch circuit of the first battery and the current value in the branch circuit of the second battery. The two batteries are connected in parallel, to improve a discharging capability of the electronic device.

According to the foldable electronic device provided in this embodiment, the first battery and the second battery with different capacities are connected in the preset connection manner, and the control circuit controls the charging circuit, the first switch, and the second switch to simultaneously charge the first battery and the second battery, or the first battery and the second battery simultaneously supply power to the load circuit of the electronic device, to increase a charging speed and improve a discharging capability of the electronic device.

Figure 5:
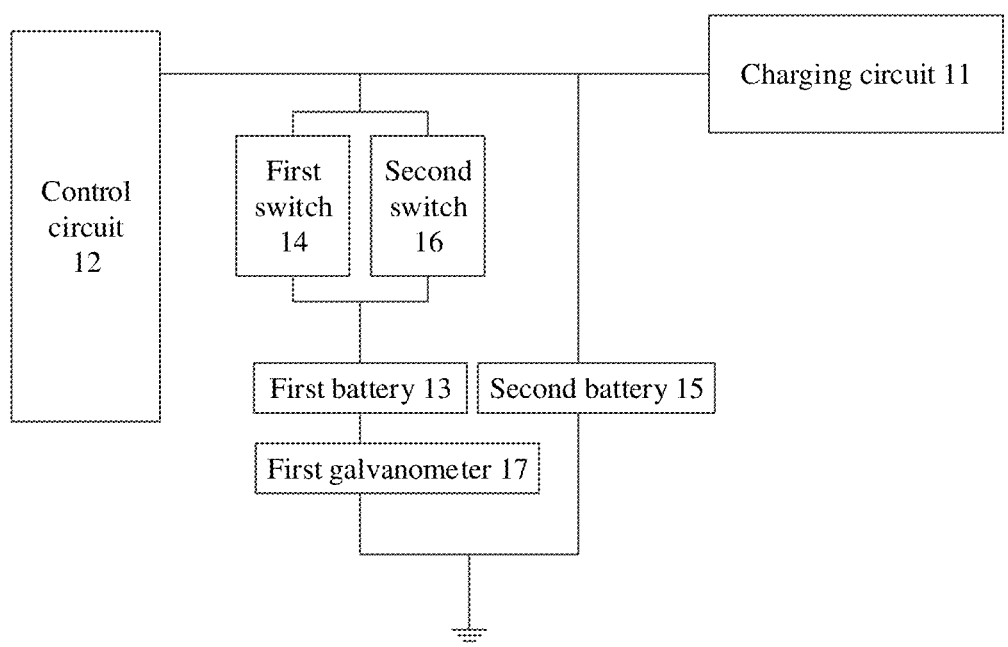
FIG. 5 is a schematic diagram of a hardware connection inside a third electronic device according to an embodiment of this application.

FIG. 5 is a schematic diagram of a hardware connection inside a third electronic device according to an embodiment of this application. Based on the embodiment shown in FIG. 2 or FIG. 4, as shown in FIG. 5, the electronic device 10 provided in this embodiment further includes a first galvanometer 17. The first galvanometer 17 is connected to the first battery 13 in series, and is configured to detect a charging current of the first battery 13. When the charging current of the first battery 13 that is detected by the first galvanometer 17 is greater than a first preset current, the control circuit 12 controls a working state of the first switch 14, to reduce the charging current of the first battery 13. The first preset current is a safety threshold current of the first battery.

The first galvanometer 17 is disposed in the first accommodation space 111.

In a charging process, the control circuit 12 learns of the charging current of the first battery 13 by detecting a current value of the first galvanometer 17. If the charging current of the first battery 13 is greater than the first preset current of the first battery 13, the control circuit 12 controls the working state of the first switch 14, for example, increases impedance of the first switch 14, to reduce the charging current of the first battery 13. Alternatively, the control circuit 12 controls the charging circuit 11 to reduce an output charging current.

Optionally, the electronic device further includes a second galvanometer (not shown in FIG. 5). The second galvanometer is connected to the second battery in series, and is configured to detect a charging current of the second battery. In the charging process, the control circuit 12 learns of the charging current of the second battery 15 by detecting a current value of the second galvanometer. If the charging current of the second battery 15 is greater than a second preset current of the second battery 15, the control circuit 12 reduces the charging current output by the charging circuit 11. The second preset current is a safety threshold current of the second battery.

Optionally, the electronic device further includes a third galvanometer (not shown in FIG. 5), configured to detect a total charging current that flows to the first battery 13 and the second battery 15. In the charging process, the control circuit 12 learns of the total charging current that flows to the first battery 13 and the second battery 15 by detecting a current value of the third galvanometer. If the total charging current that flows to the first battery 13 and the second battery 15 is greater than a third preset current, the control circuit 12 reduces the charging current output by the charging circuit 11, to prevent the first battery 13 and the second battery 15 from being overcharged. The third preset current is a safety threshold current output by the charging circuit 11.

A discharging process is the same as that in the foregoing embodiments. For details, refer to the foregoing embodiments. Details are not described herein.

According to the foldable electronic device provided in this embodiment, the first battery and the second battery with different capacities are connected in the preset connection manner, and the control circuit controls the charging circuit and the first switch to simultaneously charge the first battery and the second battery, to increase a charging speed of the electronic device. The control circuit further learns of the charging current of the first battery and/or the charging current of the second battery by detecting the galvanometer, and when the charging current is greater than the preset current, controls the charging circuit and/or the first switch to reduce the charging current of the first battery and/or the charging current of the second battery, to prevent the batteries in the electronic device from being overcharged, prolong service lives of the batteries, and ensure the charging speed and the battery lives of the batteries.

Figure 6:
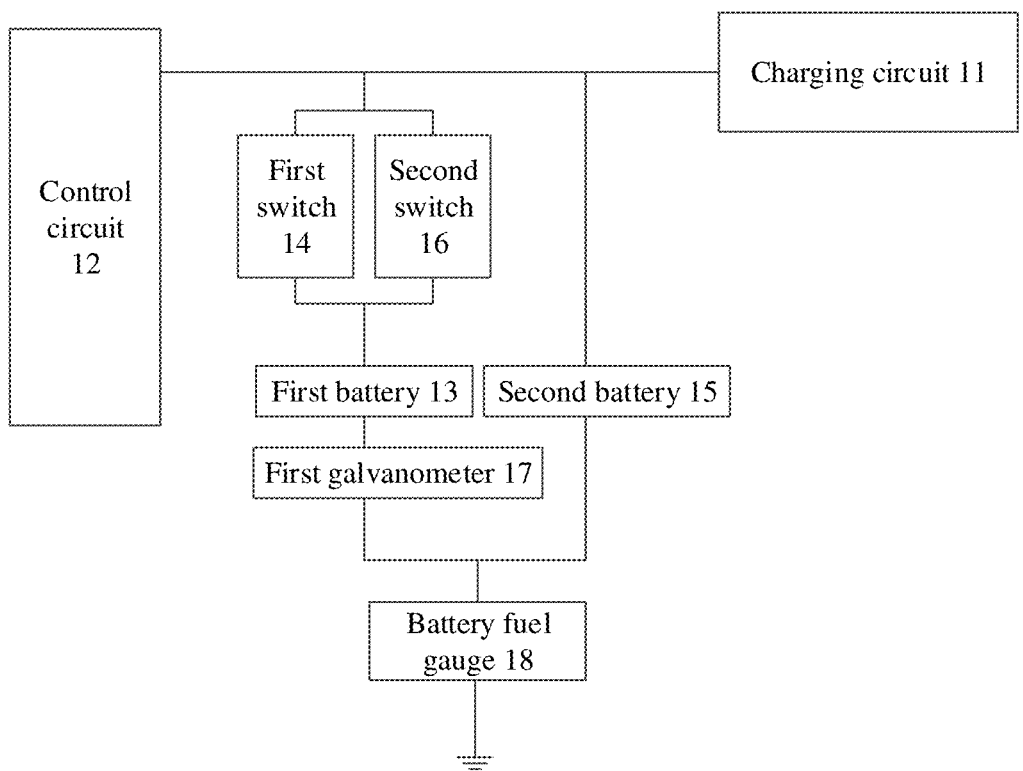
FIG. 6 is a schematic diagram of a hardware connection inside a fourth electronic device according to an embodiment of this application.

FIG. 6 is a schematic diagram of a hardware connection inside a fourth electronic device according to an embodiment of this application. Based on the embodiment shown in FIG. 2, FIG. 4, or FIG. 5, as shown in FIG. 6, the electronic device 10 provided in this embodiment further includes a battery fuel gauge 18. The first battery branch circuit and the second battery branch circuit are connected in parallel, and then are connected to the battery fuel gauge 18 in series. The battery fuel gauge 18 is configured to detect a total battery level or a total charging current of the first battery 13 and the second battery 15. The battery fuel gauge 18 is disposed in the first accommodation space 111 or the second accommodation space 112. This is not limited in this embodiment.

In a charging process, the control circuit 12 learns of the total charging current that flows to the first battery 13 and the second battery 15 by detecting the battery fuel gauge 18. If the total charging current that flows to the first battery 13 and the second battery 15 is greater than a third preset current, the control circuit 12 reduces a charging current output by the charging circuit 11, to prevent the first battery 13 and the second battery 15 from being overcharged. In addition, the control circuit 12 learns of a value of the total battery level of the first battery 13 and the second battery 15 by detecting the battery fuel gauge 18, and displays the total battery level of the batteries in the electronic device 10 on a user display interface of the electronic device 10, for example, displays the total battery level 80% of the batteries in the electronic device 10. The currently displayed total battery level is the value of the total battery level of the first battery 13 and the second battery 15 in the electronic device 10.

In a discharging process, the control circuit 12 learns of the value of the total battery level of the first battery 13 and the second battery 15 by detecting the battery fuel gauge 18, and displays the total battery level of the batteries in the electronic device 10 on the user display interface of the electronic device 10.

The control circuit 12 learns of the value of the total battery level of the first battery 13 and the second battery 15 by detecting the battery fuel gauge 18. Upon determination that the battery is fully charged, the charging circuit 11 is controlled to stop charging the battery. Upon determination that the total battery level of the batteries is less than or equal to a preset battery level value (for example, 20%), prompt information is pop up on the user display interface of the electronic device 10, so that a user charges the electronic device in a timely manner after receiving the prompt information.

According to the foldable electronic device provided in this embodiment, the first battery and the second battery with different capacities are connected in the preset connection manner, and the control circuit controls the charging circuit and the first switch to simultaneously charge the first battery and the second battery, to increase a charging speed of the electronic device. The control circuit further obtains the value of the total battery level of the first battery and the second battery by detecting the battery fuel gauge, and displays the current total battery level of the electronic device on the user display interface. The control circuit obtains the total charging current that flows to the first battery and the second battery by detecting the battery fuel gauge, and when the total charging current is greater than the third preset current, controls the charging circuit to reduce the total charging current output by the charging circuit, to prevent the batteries in the electronic device from being overcharged, prolong service lives of the batteries, and ensure the charging speed and the service lives of the batteries.

Figure 7:
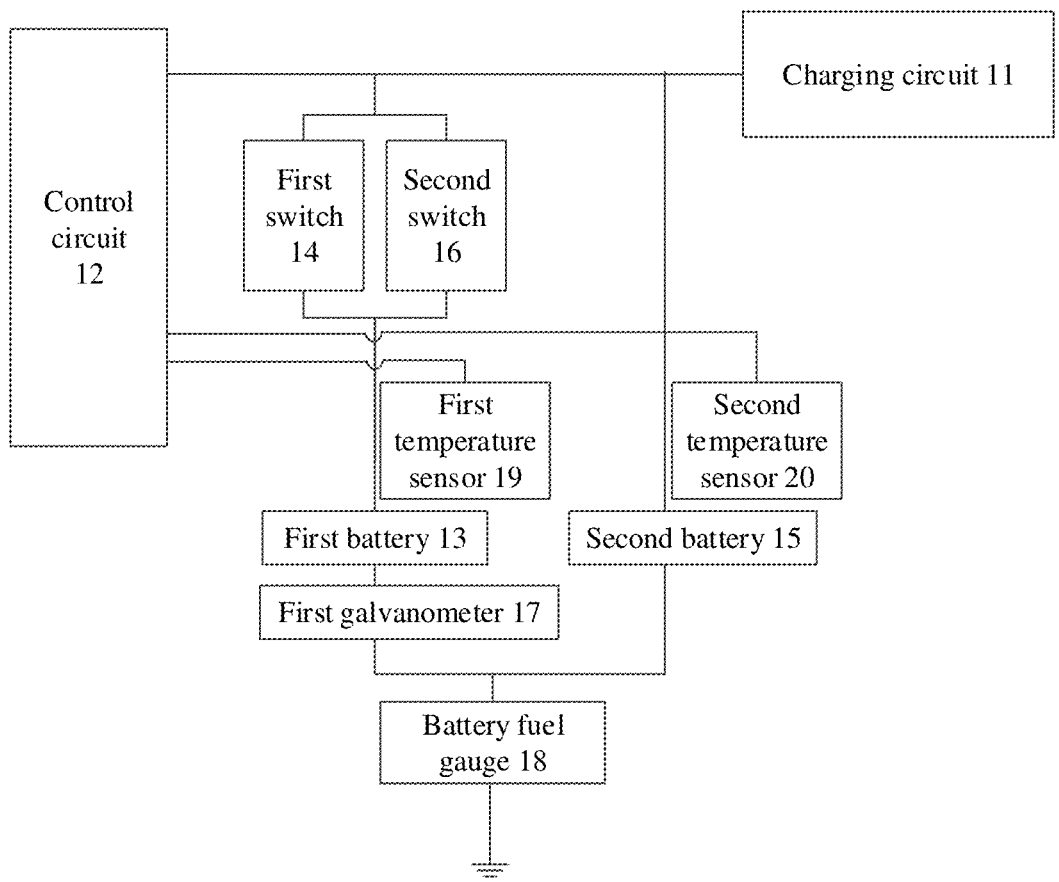
FIG. 7 is a schematic diagram of a hardware connection inside a fifth electronic device according to an embodiment of this application.

FIG. 7 is a schematic diagram of a hardware connection inside a fifth electronic device according to an embodiment of this application. Based on the embodiment shown in FIG. 2 and FIG. 4 to FIG. 6, as shown in FIG. 7, the electronic device 10 provided in this embodiment further includes a first temperature sensor 19 and a second temperature sensor 20. Each of the first temperature sensor 19 and the second temperature sensor 20 is connected to the control circuit 12 through a control line (as shown by a dashed line in FIG. 7). The first temperature sensor 19 is disposed near the first battery 13, and is configured to detect a working temperature of the first battery 13. The second temperature sensor 20 is disposed near the second battery 15, and is configured to detect a working temperature of the second battery 15.

The first battery 13 is located in the first accommodation space 111, and therefore the first temperature sensor 19 is also located in the first accommodation space 111. The second battery 15 is located in the second accommodation space 112, and therefore the second temperature sensor 20 is also located in the second accommodation space.

Optionally, the first temperature sensor 19 and the second temperature sensor 20 in this embodiment is negative temperature coefficient (NTC, negative temperature coefficient) thermistors. The negative temperature coefficient thermistor is mainly made of metal oxides such as manganese, cobalt, nickel, and copper, is manufactured by using a ceramic process, and is widely applied to temperature measurement, temperature control, temperature compensation, and the like. A resistance of the negative temperature coefficient thermistor decreases exponentially with a temperature.

In a charging process, the control circuit 12 learns of the working temperature of the first battery 13 by detecting a resistance value of the first temperature sensor 19, and learns of the working temperature of the second battery 15 by detecting a resistance value of the second temperature sensor 20. If the working temperature of the first battery 13 is greater than a safety threshold temperature of the first battery 13, the control circuit 12 controls a working state of the first switch 14, for example, increases impedance of the first switch 14, to reduce a charging current of the first battery 13, or the control circuit 12 reduces a charging current output by the charging circuit 11, to reduce the working temperature of the first battery 13. If the working temperature of the second battery 15 is greater than a safety threshold temperature of the second battery 15, the control circuit 12 reduces the charging current output by the charging circuit 11, to reduce a charging current of the second battery 15, so as to reduce the working temperature of the second battery 15.

A discharging process is the same as that in the foregoing embodiments. For details, refer to the foregoing embodiments. Details are not described herein.

According to the foldable electronic device provided in this embodiment, the first battery and the second battery with different capacities are connected in the preset connection manner, and the control circuit controls the charging circuit and the first switch to simultaneously charge the first battery and the second battery, to increase a charging speed of the electronic device. The control circuit further obtains the working temperature of the first battery and the working temperature of the second battery by detecting the first temperature sensor disposed near the first battery and the second temperature sensor disposed near the second battery, and when the working temperature of the first battery and/or the working temperature of the second battery exceeds the safety threshold temperature of the battery, controls the charging circuit to reduce the charging current output by the charging circuit, to prevent the batteries in the electronic device from being charged at a relatively high temperature, prolong service lives of the batteries, and ensure the charging speed and the service lives of the batteries.

Based on the foldable electronic device shown in FIG. 7, the electronic device includes the following circuit components: the charging circuit, the control circuit, the first switch, the second switch, the first battery, the second battery, the first temperature sensor, the second temperature sensor, the first galvanometer, and the battery fuel gauge. A connection relationship between the circuit components is the same as that in the foregoing embodiments. Details are not described herein. Proper layout is performed for the circuit components inside the electronic device, to maximize a battery capacity of the electronic device. For example, a third battery is added in a saved space, or battery capacities of the two existing batteries are expanded.

Space layout of the circuit components inside the electronic device shown in FIG. 7 is described below in detail by using a specific embodiment. The space layout provided in the following embodiment is merely used as an example, and a person skilled in the art may adjust positions of the circuit components based on an actual parameters.

Figure 8:
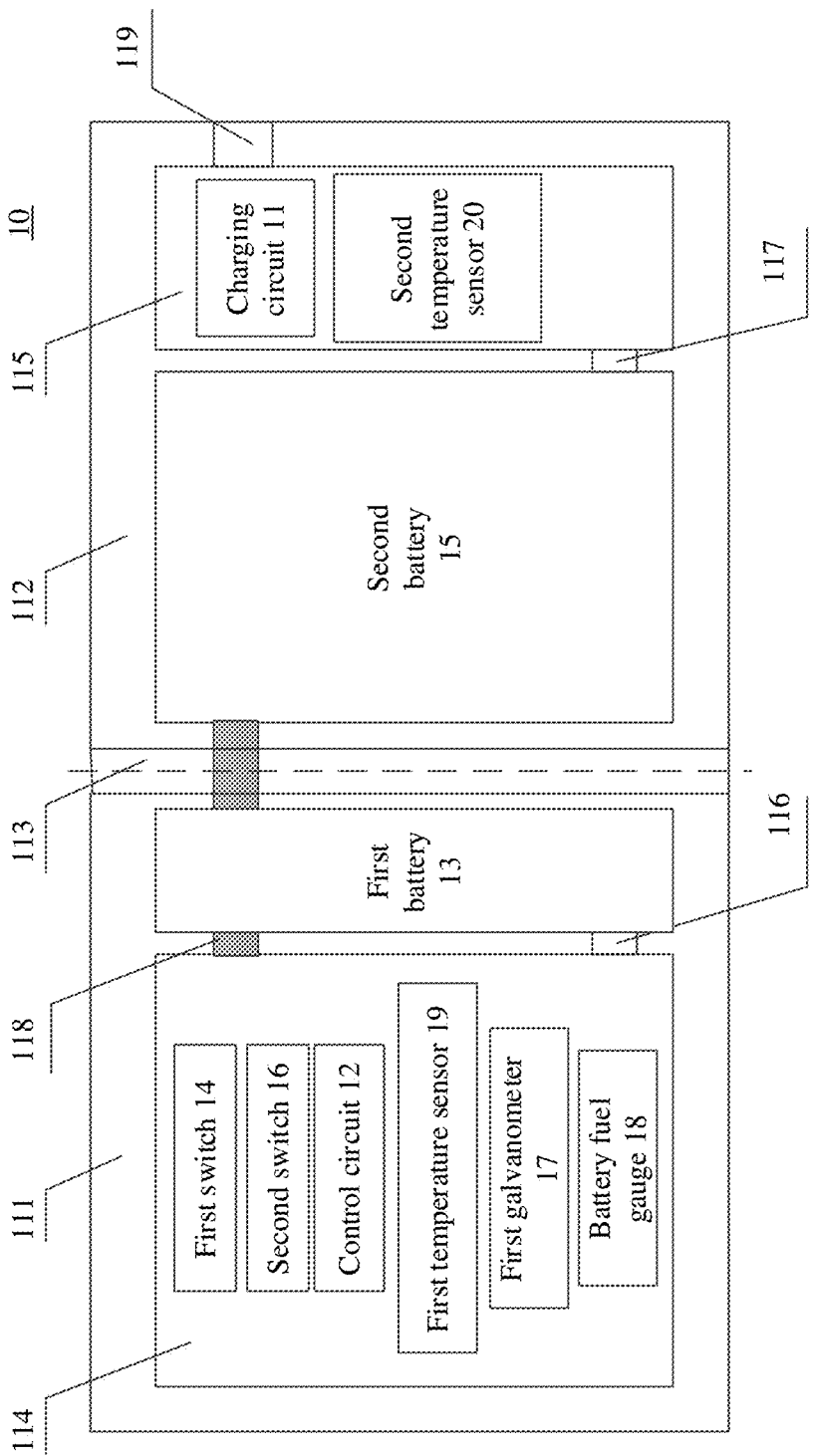
FIG. 8 is a schematic diagram of a spatial structure of a second foldable electronic device according to an embodiment of this application.

FIG. 8 is a schematic diagram of a spatial structure of a second foldable electronic device according to an embodiment of this application. Based on the embodiment shown in FIG. 3, the electronic device 10 provided in this embodiment further includes a first printed circuit board 114 and a second printed circuit board 115. In this embodiment, a size of the first printed circuit board 114 is greater than a size of the second printed circuit board 115.

Usually, a larger capacity of a battery indicates a larger size and a heavier weight of the battery. In this embodiment, a battery capacity of the first battery 13 is less than a battery capacity of the second battery 15. In some embodiments, a size of the first battery 13 is less than a size of the second battery 15. To fully use the two accommodation spaces of the electronic device 10, the first battery 13 of a relatively small size and the first printed circuit board 114 of a relatively large size are disposed in the first accommodation space 111, and the second battery 15 of a relatively large size and the second printed circuit board 115 of a relatively small size are disposed in the second accommodation space 112.

Specifically, the first printed circuit board 114 is connected to the first battery 13 through a first connector 116, and the second printed circuit board 115 is connected to the second battery 15 through a second connector 117. The first switch 14, the second switch 16, the control circuit 12, the first galvanometer 17, the battery fuel gauge 18, and the first temperature sensor 19 are disposed on the first printed circuit board 114. The charging circuit 11, the second temperature sensor 20, and a charging interface 119 are disposed on the second printed circuit board 115. The second battery 15 is connected to the first printed circuit board 114 through a flexible printed circuit (FPC, flexible printed circuit) 118. Through the foregoing setting, the circuit components are arranged on the printed circuit boards in an orderly manner, to implement compact space layout and make room for another functional component.

The charging circuit 11 in this embodiment is disposed at a position that is of the second printed circuit board 115 and that is close to the charging interface 119. Through the foregoing setting, a charging path is greatly shortened, and a path loss of the charging path is reduced, to increase a charging speed.

Optionally, in this embodiment, the first battery 13 is disposed on a side that is of the first accommodation space 111 and that is close to the bendable member 113, and the second battery 15 is disposed on a side that is of the second accommodation space 112 and that is close to the bendable member 113. Correspondingly, the first printed circuit board 114 is disposed on a side that is of the first accommodation space 111 and that is far away from the bendable member 113, and the second printed circuit board 115 is disposed on a side that is of the second accommodation space 112 and that is far away from the bendable member 113.

According to the electronic device provided in this embodiment, an internal space is divided into two accommodation spaces by the bendable member, and one battery is placed in each accommodation space, to increase a total battery capacity of the electronic device. Proper layout is performed for the circuit components inside the electronic device, and the path loss of the charging path inside the electronic device is reduced, to increase a charging speed of the battery in the electronic device.

In this embodiment, two accommodation spaces are used as an example for description. Certainly, an electronic device that includes at least two accommodation spaces (for example, three accommodation spaces, which are obtained by performing folding twice) is designed based on an actual parameters. Correspondingly, a third battery is added in a newly added accommodation space. If a battery capacity of the third battery is less than the battery capacity of the first battery, a third switch (a charging and current limiting switch) and a fourth switch (a discharge switch) is added in a branch circuit in which the third battery is located, to ensure charging/discharging safety of the third battery. An implementation principle and technical effects of properly laying out the three batteries in the three accommodation spaces are similar to those in the foregoing embodiments, and are not specifically described herein.

The electronic device provided in this application is not limited to the foregoing foldable electronic device. Provided that the internal space of the electronic device is divided into at least two accommodation spaces, the circuit inside the electronic device provided in the foregoing embodiments and the layout idea of the components in the circuit is used, and a fast charging/discharging function is implemented through software control. For example, the electronic device is a slide mobile phone or a flip mobile phone.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An electronic device comprises:
a charging circuit;
a control circuit;
a first battery branch circuit;
a second battery branch circuit;
a first accommodation space;
a second accommodation space;
a bendable member that connects the first accommodation space and the second accommodation space;
a first battery disposed in the first accommodation space; and
a second battery disposed in the second accommodation space;
wherein:
the first battery branch circuit and the second battery branch circuit are connected in parallel;
the first battery branch circuit comprises the first battery and a first switch connected in series;
the second battery branch circuit comprises the second battery; and
when the charging circuit receives a charging current, the control circuit controls the charging circuit to charge the first battery and the second battery, and
the control circuit is further configured to control a working state of the first switch, to regulate a charging current that flows to the first battery.

2. The electronic device of claim 1, wherein the control circuit is further configured to regulate an impedance value of the first switch and regulate a charging current that flows to the first battery.

3. The electronic device of claim 1, wherein the first battery branch circuit further comprises a second switch, the second switch and the first switch are connected in parallel; and
the first battery supplies power to a load circuit of the electronic device through the second switch.

4. The electronic device of claim 1, further comprises;
a first galvanometer connected to the first battery in series, and is configured to detect the charging current of the first battery.

5. The electronic device of claim 4, when the charging current of the first battery that is detected by the first galvanometer is greater than a first preset current, the control circuit controls the working state of the first switch.

6. The electronic device of claim 1, further comprises:
a battery fuel gauge configured to detect a battery level of the first battery and the second battery.

7. The electronic device of claim 1, further comprises:
a battery fuel gauge configured to detect a total charging current of the first battery and the second battery.

8. The electronic device according to claim 1, wherein the electronic device displays battery level information based on battery level that is of the first battery and the second battery.

9. An electronic device comprises:
a charging circuit;
a control circuit;
a first battery branch circuit;
a second battery branch circuit;
a first accommodation space;
a second accommodation space;
a bendable member that connects the first accommodation space and the second accommodation space;
a first battery disposed in the first accommodation space; and
a second battery disposed in the second accommodation space;
wherein:
the first battery branch circuit and the second battery branch circuit are connected in parallel;
the first battery branch circuit comprises the first battery and a first switch connected in series;
the second battery branch circuit comprises the second battery; and
when the charging circuit receives a charging current, the control circuit controls the charging circuit to charge the first battery and the second battery;
a first temperature sensor; and
a second temperature sensor;
wherein:
the first temperature sensor is configured to detect a temperature of the first battery;
the second temperature sensor is configured to detect a temperature of the second battery; and
the control circuit is configured to control, based on the temperature of the first battery or the temperature of the second battery, a charging current output by the charging circuit.

10. The electronic device of claim 1, further comprises:
a battery fuel gauge configured to detect a total charging current that flows to the first battery and the second battery; and
the control circuit is configured to control a charging current output by the charging circuit based on the total charging current that flows to the first battery and the second battery and that is detected by the battery fuel gauge.

11. The electronic device of claim 1, further comprises:
a first galvanometer connected to the first battery in series, and configured to detect the charging current of the first battery; and
the control circuit is configured to control a charging current output by the charging circuit based on the charging current of the first battery that is detected by the first galvanometer.

12. The electronic device of claim 10, further comprises:
a first temperature sensor, which is configured to detect a temperature of the first battery; and
the control circuit is configured to control a charging current output by the charging circuit based on the temperature of the first battery that is detected by the first temperature sensor.

13. The electronic device of claim 10, further comprises:
a second temperature sensor which is configured to detect a temperature of the second battery; and
the control circuit is configured to control a charging current output by the charging circuit based on the temperature of the second battery that is detected by the second temperature sensor.

14. The electronic device of claim 1, wherein a battery capacity of the first battery is less than a battery capacity of the second battery.

15. The electronic device of claim 1, wherein the first switch and the control circuit are disposed in the first accommodation space, and the charging circuit is disposed in the second accommodation space.

16. The electronic device of claim 1, wherein a battery capacity of the first battery is different with a battery capacity of the second battery.

17. The electronic device of claim 1, wherein the electronic device is a foldable electronic device, and the control circuit is configured to facilitate simultaneous charging of the first battery and the second battery.

18. The electronic device of claim 1, further comprises:
a first printed circuit board and a second printed circuit board;
the first battery and the first printed circuit board are disposed in the first accommodation space, the second battery and the second printed circuit board are disposed in the second accommodation space; and
the first battery is connected to the first printed circuit board through a first connector, and the second battery is connected to the second printed circuit board through a second connector.

19. The electronic device of claim 18, further comprises:
a charging interface, wherein the charging interface is disposed on the second printed circuit board.

* * * * *